United States Patent [19]

Sorrentino et al.

[11] Patent Number: 5,133,808
[45] Date of Patent: Jul. 28, 1992

[54] CLEANING PROCESS FOR RADIOACTIVE MACHINE SHOP TURNINGS

[75] Inventors: Peter P. Sorrentino, Trumbull; Lois K. Sivahop, Nichols, both of Conn.

[73] Assignee: Avco Corporation, Providence, R.I.

[21] Appl. No.: 665,349

[22] Filed: Mar. 6, 1991

[51] Int. Cl.$^5$ ............................................. B08B 3/04
[52] U.S. Cl. ................... 134/10; 134/25.1; 134/34; 134/35; 134/40
[58] Field of Search .................. 134/19, 10, 25.1, 39, 134/35, 40

[56] References Cited

U.S. PATENT DOCUMENTS

| | | | |
|---|---|---|---|
| 1,392,781 | 10/1921 | Marsh et al. | 134/63 |
| 1,510,504 | 10/1924 | Schweinsberg et al. | 134/65 |
| 1,545,979 | 7/1925 | Rosenberg | 134/104.4 |
| 2,398,725 | 4/1946 | Schutte | 196/18 |
| 2,852,418 | 9/1958 | MacDonald | 134/2 |
| 2,954,122 | 9/1960 | Colburn | 209/8 |
| 3,144,872 | 8/1964 | Kearney | 134/72 |
| 3,163,929 | 1/1965 | Goodstein | 134/25.1 |
| 3,198,622 | 8/1965 | Herzog et al. | 75/1 |
| 3,685,629 | 2/1975 | Dankoff et al. | 134/19 |
| 3,754,559 | 8/1973 | Seiwert | 134/65 |
| 3,865,629 | 2/1975 | Dankoff et al. | 134/19 |
| 3,973,573 | 8/1976 | Seiwert | 134/63 |
| 4,073,301 | 2/1978 | Mackinnon | 134/65 |
| 4,097,306 | 1/1978 | Carman | 134/21 |
| 4,565,583 | 1/1986 | Venetta | 134/25.1 |
| 4,569,787 | 2/1986 | Horiuchi et al. | 134/10 |
| 4,719,933 | 1/1988 | Jackson | 134/65 |

Primary Examiner—Theodore Morris
Assistant Examiner—Saeed Chaudhry
Attorney, Agent, or Firm—Perman & Green

[57] ABSTRACT

The present invention relates to a process provided for cleaning magnesium thoriated scrap turnings resulting from machining operations. It results in the recovery of a maximum possible amount of magnesium thorium alloy for future use while ensuring protection of the environment. The process reduces to a minimum the amount of the hazardous waste which must otherwise be buried at great expense and with continuing legal liability to the burying party. A batch of the magnesium thoriated scrap turnings is rapidly flooded, then washed, with a solution of heated water and detergent. Thereupon, the water, detergent and impurities are removed from the scrap turnings, and the batch dried. Thereafter, ferrous material present in the washed batch of magnesium thoriated scrap turnings is separated from non-ferrous material and the latter is classified into processed turnings and fines. The processed turnings, fines and the ferrous material are then separately packaged.

8 Claims, 2 Drawing Sheets

5,133,808

CLEANING PROCESS FOR RADIOACTIVE MACHINE SHOP TURNINGS

BACKGROUND OF THE INVENTION

1. Field of the Invention

The present invention relates generally to processes for cleaning scrap materials and, more particularly, to a process for cleaning radioactive scrap turnings, such as magnesium thoriated alloy materials, resulting from machining operations in preparation for further processing.

2. Description of the Prior Art

In machining critical components of magnesium for gas turbine engines which must meet close tolerances, it has been found desirable to use a thorium alloy of magnesium. Thorium is a rare earth which, when mixed with the magnesium to the extent of approximately 3%, results in a harder material which provides a superior surface for close tolerance machining.

A drawback of using thorium, however, is the fact that it is a radioactive material, albeit of a low grade nature (LSA-radioactive II) and therefore requires specialized handling, including specialized waste disposal. Thus, after machine operations are performed resulting in scrap turnings, before subsequent operations are performed to recover thoriated magnesium for reuse or to dispose of radioactive fines which cannot be reprocessed because of their small size and which must be properly buried, the turnings and fines must first be cleaned to remove substantially all foreign material. Such foreign material is taken to include ferrous swarf, oil, cutting fluid, and moisture.

The cleaning of cuttings from machining operations to enable recycling of the cuttings is not in itself a new concept. Known apparatus for cleaning newly manufactured articles or scrap materials including turnings and cuttings prior to their reuse has been disclosed in numerous patents. Typical of such patents are U.S. Pat. Nos. 4,719,933 to Jackson, 4,073,301 to Mackinnon, 3,973,573 and 3,754,559, both to Seiwert. A method of cleaning oily metallic cuttings to enable their reprocessing is also disclosed in U.S. Pat. No. 2,852,418 to MacDonald. Additionally, various methods and apparatus for magnetically separating ferrous material from non-ferrous material have long been known and typical disclosures are provided in U.S. Pat. Nos. 3,865,629 to Dankoff et al, 3,198,622 to Herzog et al, 2,954,122 to Colburn, and 2,398,725 to Schutte.

However, in none of these instances has there been any disclosure, or suggestion, of cleaning radioactive materials to enable their further processing, either for purposes of recycling or for purposes of disposal. It was in light of the prior art as just briefly described that the present invention has been conceived and is now reduced to practice.

SUMMARY OF THE INVENTION

The present invention relates to a process provided for cleaning magnesium thoriated scrap turnings resulting from machining operations. It results in the recovery of a maximum possible amount of magnesium thorium alloy for future use while ensuring protection of the environment. The process reduces to a minimum the amount of the hazardous waste which must otherwise be buried at great expense and with continuing legal liability to the burying party. A batch of the magnesium thoriated scrap turnings is rapidly flooded, then washed, with a solution of heated water and detergent. Thereupon, the water, detergent and impurities are removed from the scrap turnings, and the batch dried. Thereafter, ferrous material present in the washed batch of magnesium thoriated scrap turnings is separated from non-ferrous material and the latter is classified into processed turnings and fines. The processed turnings, fines and the ferrous material are then separately packaged either for subsequent disposal or reprocessing.

The sequence and time durations of the various steps in the process have been carefully determined in order to achieve resulting materials which are sufficiently pure that they can be used for recycling, or for disposal without adverse effect to the environment and in keeping with restrictions imposed by governmental authorities.

The invention utilizes known equipment and materials but achieves results which were not heretofore known. Waste is minimized and the amount of materials which are available for use again at a later time is maximized. Notwithstanding the foregoing, the process being disclosed is a simplified one requiring a minimum amount of time, personnel, and effort while achieving the optimum results mentioned.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 2 is a diagrammatic representation of subsequent steps in the process of the invention, namely, separation of the washed and dried material into ferrous swarf, non-ferrous material subject to reprocessing, and non-ferrous fines which must be disposed of.

DETAILED DESCRIPTION OF THE PREFERRED EMBODIMENT

It was previously mentioned that it is desirable to utilize a thorium alloy of magnesium in order to improve the machinability of the magnesium, particularly, when machining to very close tolerances. It was also noted that thorium is a radioactive material. As a result, scrap turnings and swarf resulting from machining operations on the magnesium thoriated alloy must be properly handled before reprocessing or disposal can be performed. The invention is directed toward an optimized process for this purpose.

Figure 1A:
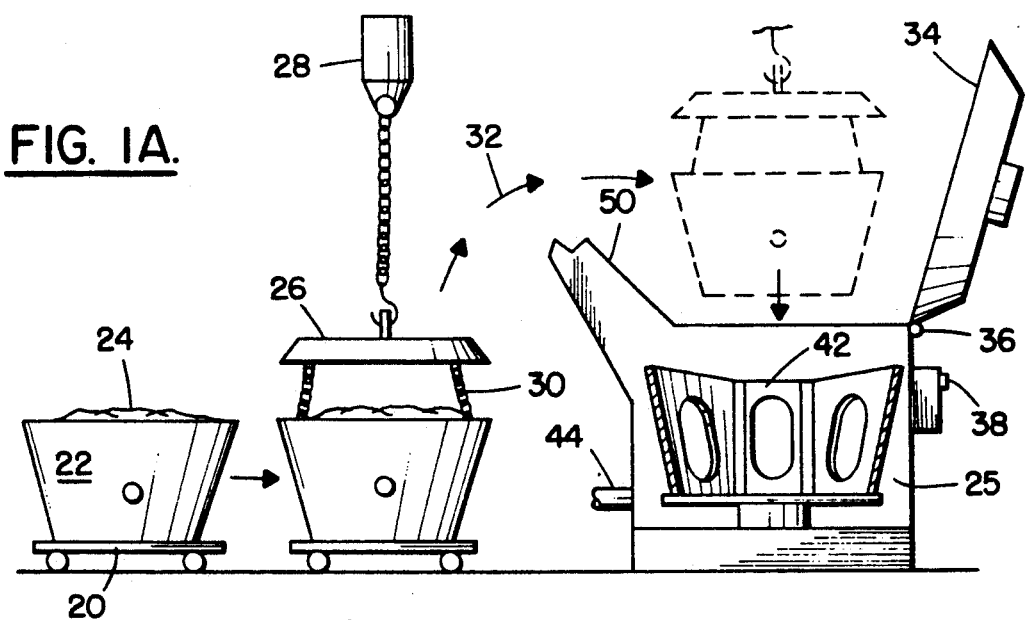
FIG. 1A diagrammatically represents a first step in the process of the invention, which entails loading material to be processed into an industrial washer/dryer machine.
Figure 1B:
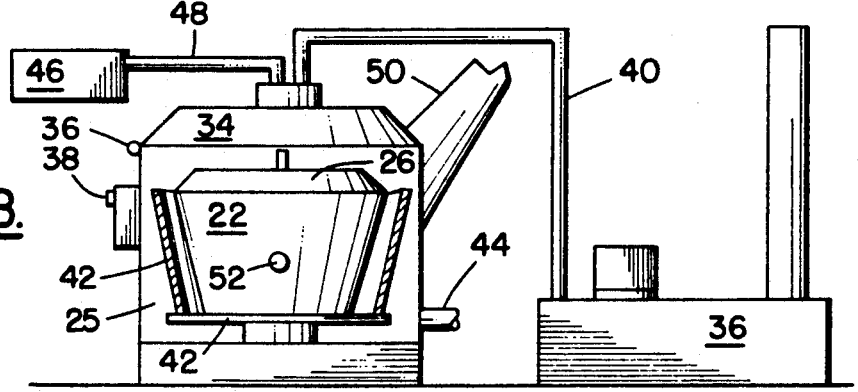
FIG. 1B diagrammatically represents subsequent steps in the process of the invention, namely, washing and drying of the material.
Figure 1C:
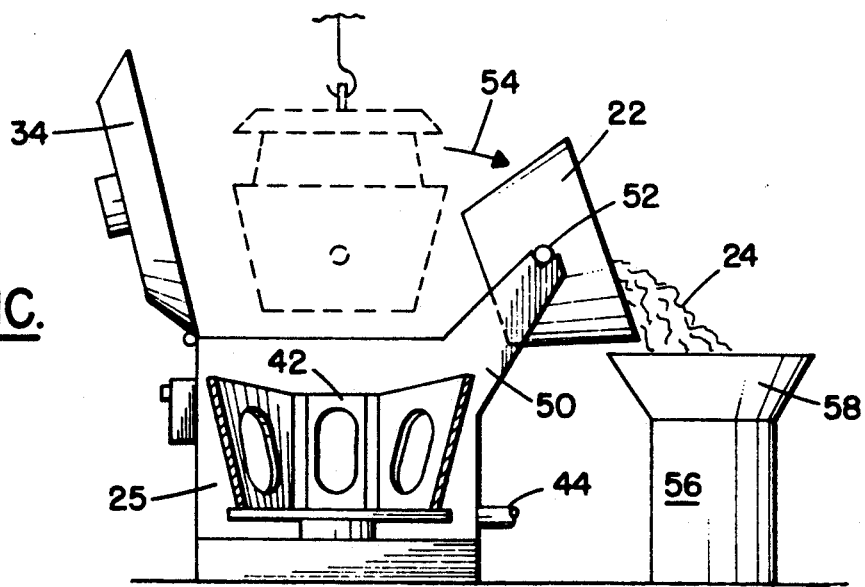
FIG. 1C represents still a further step in the process of the invention, namely, removal of the washed and dried material from the washer/dryer machine and its placement in a suitable container, temporarily.

Turn now to the drawings and, initially, to FIGS. 1A, 1B, and 1C. The drawings are diagrammatic in nature, intended to portray in a straightforward manner the basic concepts of the invention which, for the most part, utilize commercially available equipment. As seen in FIG. 1A, a dolly 20 supporting a basket 22 into which has been placed a load 24 of magnesium thoriated scrap turnings and ferrous swarf is moved into position adjacent a centrifuge washer/dryer machine 25. It will be appreciated that the ferrous swarf generally comprises particles from a machine tool itself resulting from the machining process as well as particles picked up from preceding but unassociated machining processes.

With the basket 22 so positioned, a suitable cover 26 is lowered into position by means of a chain hoist 28 and suitably attached to the basket as by chains 30. Thereupon, as indicated by arrows 32 and by a dotted line representation, the basket 22 is raised, translated, then lowered into the interior of the centrifuge washer/dryer machine 25.

Advancing to FIG. 1B, the cover 26 is lowered into position on the basket 22 to maintain intact the load 24 and a lid 34 for the machine 25 is pivoted to a closed position about a hinge 36, then suitably locked in that position. A suitable machine 25 for purposes of the invention is Barrett centrifuge washer/dryer Model No. 1100-CW manufactured by Barrett Centrifugals of Worcester, Mass. It will be appreciated that the basket 22 and its cover 26 are suitably perforated to assure containment of the load 24 while enabling reasonably free passage therethrough of a liquid washing solution.

With the basket 22 and its load 24 properly received within the washer/dryer machine 25, suitable detergent is premixed and added to a steam heated reservoir tank 36. Suitable for this purpose is detergent SP1388 manufactured by Rem Chemicals, Inc. of Southington, Conn. In size, the reservoir tank 36 typically contains 120 gallons and water temperature, thermostatically controlled, is maintained at approximately 180° F. This may be accomplished by recirculating steam heating coils installed in the recirculating tank 36.

At this point, an operator presses an actuation button 38 which initiates the washing process. Washing liquid is thereby introduced into the washer/dryer machine 25 from the reservoir tank 36 via a conduit 40 such that it issues through a suitable nozzle (not shown) at the interior of the lid 34. The washing liquid is introduced at a flow rate chosen to completely flood the load 24 located in the basket 22 and fill the washer/dryer machine 25 within a time period range of 30 to 70 seconds and, preferably, within 50 seconds, the washer/dryer machine typically having a capacity of 6.5 gallons.

In the course of the washing process, as illustrated diagrammatically in FIG. 1B, the basket 22 is seen to rest in an internal basket 42 which is reciprocably rotated about the vertical axis in the manner of a conventional domestic washing machine. To assure unitary rotation of both the basket 22 and the internal basket 42, a pair of outwardly extending lugs 52 on the basket 42 suitably engage the structure of the inner basket. The duration of a such a wash cycle may be generally in the range of approximately three to five minutes, a preferable duration being four minutes.

Thereafter, the washing liquid and removed impurities including ferrous swarf, oil, coolant liquid, are removed via a drain 44 during the drying cycle. The return wash water is reprocessed through a series of processing tanks and a filtering system which includes an oil/water separator, two large CUNA filters and a recirculating pump. Oil may be skimmed off the return wash water into a separate tank. At this point, an oil/water separator is activated and waste oil directed to a container, such as a 55 gallon drum for disposal. The clean water is thereafter ready for reuse.

Thereupon, the internal basket 42 continues to rotate, either reciprocably or in the same direction for a period of time which depends upon the density of the material in the load 24, but generally for a duration in the range of approximately 20 to 45 minutes, a preferable time being 30 minutes. During the drying cycle, heated air is introduced from a suitable source 46 via a conduit 48 to a nozzle (not shown) which extends to the inside of the lid 34.

At an appointed time following the drying cycle, the lid 34 is released and opened to the position illustrated in FIG. 1C. The basket 22 is lifted by means of the hoist 28 out of the interior of the washer/dryer machine 25 and into position on a pair of spaced recesses defined at the extremities of finger brackets 50. The finger bracket 50 extend at spaced locations away from the outer housing of the washer/dryer machine 25 and the recesses at their upper ends are positioned to rotatably receive support lugs 52 extending radially from opposite sides of the basket 22. With proper manipulation of the hoist 28, the basket 22 is rotated in the manner of an arrow 54 to discharge its load 24, now washed and dried, into a suitable container 56 which may be, for example, a standard 55 gallon drum 56. The discharge operation may involve the aid of a funnel 58. It is noteworthy that the moisture content of the load 24 as it is discharged from the basket 22 into the container 56 preferably has a moisture content in the range of 0.2 to 1.0 percent.

Figure 2:
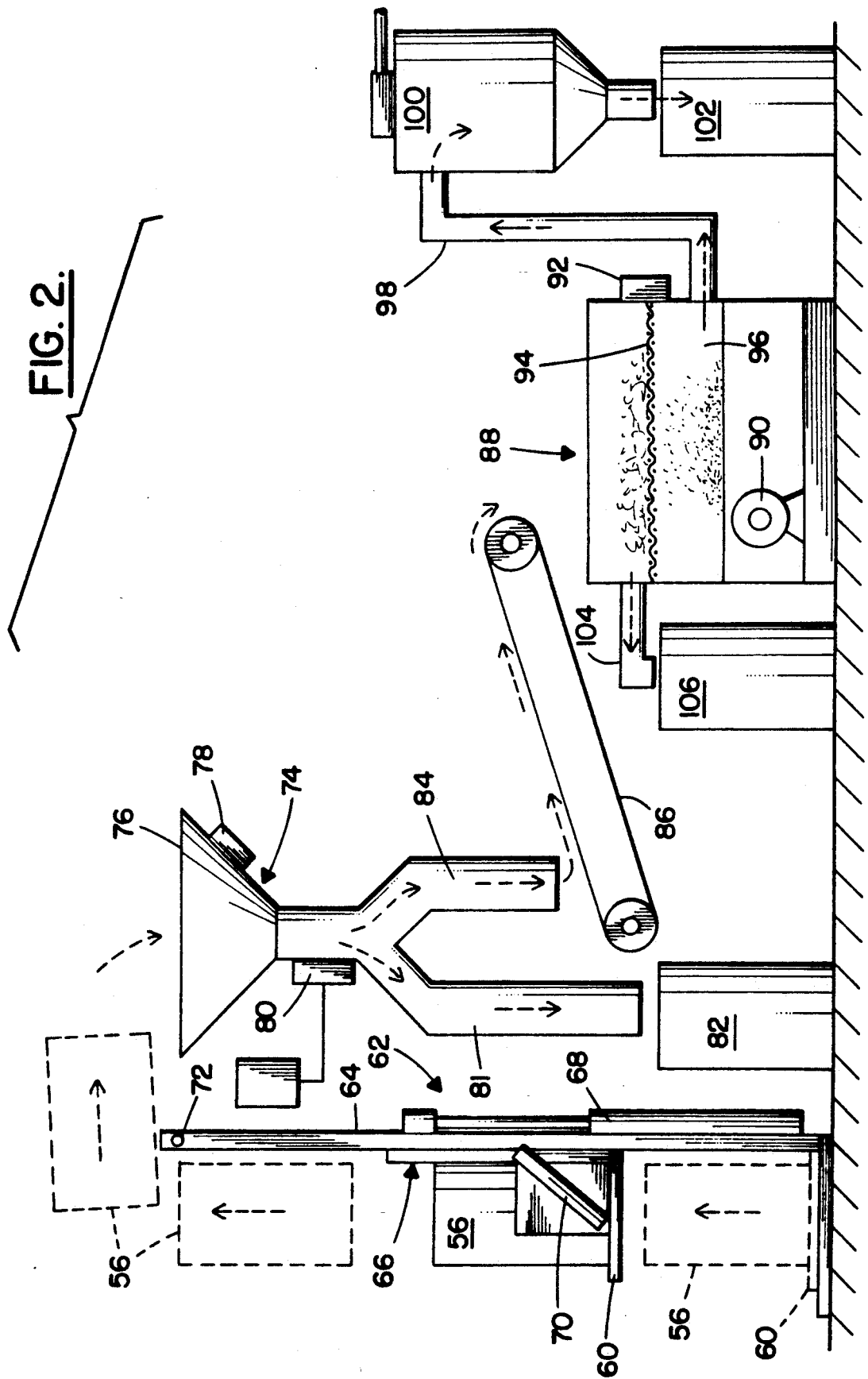

Turn now to FIG. 2. The funnel 58 is removed from the container 56 and the container is then positioned on a base plate 60 of a high level dumper 62 which includes a stationary structure 64 and an elevator unit 66. The high level dumper may be of the construction of Hercules Model 81-19 with an AM2 air motor as sold by Ebony Industries, Inc. of Woburn, Mass. The elevator unit 66 can be moved vertically along the stationary structure 64 by means of a pneumatic actuator 68 generally in the direction of the unnumbered dotted line arrows between a ground level position and an uppermost position, both as indicated by dashed lines. The construction of the high level dumper 62 is such that as the elevator unit 66 ascends, angled arm members 70 on the elevator unit are caused to engage, respectively, camming pins 72 projecting from opposite sides of the stationary structure 64. When that occurs, the elevator unit 66 is caused to pivot in a clockwise direction (FIG. 2) about a pivot axis so as to discharge the washed and dried load 24 into a feeder and magnetic separator machine 74. For purposes of the invention, a suitable feeder machine and magnetic separator may be that identified as Sketch No. 052289 manufactured by Eriez Magnetics of Erie, Pa.

A hopper 76 for the feeder and magnetic separator machine 74 is provided with a suitable vibrator 78 which operates in conjunction with a rotating magnet 80 which serves to draw the ferrous material away from the remainder of the load 24 and deposits it into a suitable container 82 which may also be, for example, a 55 gallon drum. The container 82 is removed, when filled. The ferrous swarf has been cleaned and decontaminated and can be recycled into an appropriate steel making process.

Non-ferrous material remaining from the load 24, also issues from the hopper 76, on this occasion via a discharge chute 84 onto a suitable conveyor 86 which may be, for example, a Hytrol conveyor, model PC, sold by Eriez Magnetics, of Erie, Pa.

The non-ferrous material, having issued from the machine 74 is advanced by the conveyor 86 to a dedusting and particle sizing machine 88. One acceptable commercial version of the machine 88 is a Sweco, Inc. Model US48C68 sold by PME Equipment, Inc. of Union, N.J. As in the instance of all of the other equipment disclosed herein, because of the extreme flammability of magnesium turnings and particles, the machine 88 utilizes an explosion proof motor 90 which suitably operates a vibrator 92. The washed non-ferrous material is delivered from the conveyor 86 onto a stainless steel screen 94, preferably, of 16-mesh size. By reason of the vibrator 92, any non-ferrous material having a size less than 16-mesh falls through into a receiving cavity 96. These resulting "fines" are removed from the cavity 96 via a conduit 98 and by means of a suitable dust collector, the fines are delivered into a suitable container 102 which may be, for example, a 55 gallon drum. The fines which have been delivered to the container 102 are considered to be "hazardous waste" since they contain thorium but are not readily capable of being reprocessed, because of their small size, and must be disposed of in a proper manner in accordance with the regulations dealing with hazardous waste.

Non-ferrous material which is larger than 16-mesh size finds its way via a discharge chute 104 into a container 106. The container is preferably a 17H (Department of Transportation approved) 55 gallon drum suitable for shipment to a reprocessor. The material within the container 106 is also considered to be hazardous waste since it contains thorium, but is capable of being reprocessed into ingot form of magnesium thorium and, thus, can be reused.

The process just described has been eminently successful in minimizing waste, maximizing recovered materials, and assuring protection of the environment. Typical in this regard is the fact that out of each starting amount of the material comprising a load 24, approximately 5 percent is in the nature of fines which must be disposed of as hazardous waste. The other 95 percent can all be utilized.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A process for the recovery of magnesium thorium alloy from radioactive scrap turnings which include magnesium thoriated alloy material, ferrous material, cutting oil, and lubricant coolant resulting from machining operations in preparation for recycling comprising the steps of:
   (a) over a duration of time in the range of 30 to 70 seconds, flooding a batch of the radioactive turnings with a solution of detergent and water heated to a temperature of approximately 180° F.;
   (b) for a duration of time in the range of 3 to 5 minutes, washing the batch of the radioactive turnings with the solution of heated water and detergent;
   (c) removing from the batch of the radioactive turnings the solution of heated water and detergent and impurities including the cutting oil and the lubricant coolant;
   (d) for a duration of time in the range of 20 to 45 minutes, drying the washed batch of radioactive turnings until a moisture content in the range of 0.2 to 1.0 percent is achieved; and
   (e) separating ferrous material present in the washed batch of radioactive turnings from non-ferrous material therein.

2. A process as set forth in claim 1 including the step of:
   (g) separately packaging the processed turnings, the fines and the ferrous material.

3. A process as set forth in claim 1 including the step of:
   (h) preceding step (a), premixing the solution of heated water and detergent in a reservoir separate from the container for the batch of the radioactive turnings.

4. A process as set forth in claim 1 wherein step (d) includes the steps of:
   (i) supporting the washed batch of radioactive turnings in a perforated container; and
   (j) rotating the perforated container to remove moisture from the radioactive turnings by movement of air and by centrifugal action.

5. A process as set forth in claim 4 wherein step (d) further includes the step of:
   (k) introducing heated air into the container to remove moisture from the radioactive turnings.

6. A process as set forth in claim 1 wherein step (e) includes the step of:
   (l) magnetically removing the ferrous material from the radioactive turnings; and
   (m) directing the ferrous material into a container to await recycling.

7. A process as set forth in claim 1 including the step of:
   (f) classifying the non-ferrous material into processed turnings and fines.

8. A process as set forth in claim 7 wherein the processed turnings of step (f) are of a size greater than approximately 16-mesh size and wherein the processed fines of step (f) are of a size less than approximately 16-mesh size.

* * * * *